United States Patent
Ertl

(10) Patent No.: US 11,561,954 B2
(45) Date of Patent: Jan. 24, 2023

(54) METHOD AND SYSTEM TO ESTIMATE THE CARDINALITY OF SETS AND SET OPERATION RESULTS FROM SINGLE AND MULTIPLE HYPERLOGLOG SKETCHES

(71) Applicant: Dynatrace LLC, Waltham, MA (US)

(72) Inventor: Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 33 days.

(21) Appl. No.: 17/358,170

(22) Filed: Jun. 25, 2021

(65) Prior Publication Data
US 2021/0319006 A1 Oct. 14, 2021

Related U.S. Application Data

(63) Continuation of application No. 15/950,632, filed on Apr. 11, 2018, now Pat. No. 11,074,237.

(60) Provisional application No. 62/485,439, filed on Apr. 14, 2017.

(51) Int. Cl.
| | |
|---|---|
| *G06F 16/22* | (2019.01) |
| *G06N 7/00* | (2006.01) |
| *G06F 16/23* | (2019.01) |
| *G06F 17/18* | (2006.01) |

(52) U.S. Cl.
CPC ...... *G06F 16/2282* (2019.01); *G06F 16/2255* (2019.01); *G06F 16/2379* (2019.01); *G06F 17/18* (2013.01); *G06N 7/005* (2013.01)

(58) Field of Classification Search
CPC .......................... G06F 16/2282; G06F 16/2379
USPC ....................................................... 707/803
See application file for complete search history.

(56) References Cited

U.S. PATENT DOCUMENTS

| | | | |
|---|---|---|---|
| 8,151,277 B2 | 4/2012 | Greifeneder et al. | |
| 8,234,631 B2 | 7/2012 | Greifeneder et al. | |
| 8,819,038 B1* | 8/2014 | Rhodes ................. | G06F 16/284 707/756 |
| 10,055,506 B2* | 8/2018 | Rhodes ................. | G06F 16/958 |
| 2011/0046924 A1* | 2/2011 | Natarajan ............... | G06F 17/18 703/2 |
| 2012/0221296 A1* | 8/2012 | Fu ........................... | G06F 17/14 702/190 |
| 2012/0254092 A1* | 10/2012 | Malov ................ | G06Q 30/0201 706/52 |
| 2012/0304172 A1 | 11/2012 | Greifeneder et al. | |

(Continued)

*Primary Examiner* — Muluemebet Gurmu
(74) *Attorney, Agent, or Firm* — Harness, Dickey & Pierce, P.L.C.

(57) ABSTRACT

A system and method for the estimation of the cardinality of large sets of transaction trace data is disclosed. The estimation is based on HyperLogLog data sketches that are capable to store cardinality relevant data of large sets with low and fixed memory requirements. The disclosure contains improvements to the known analysis methods for HyperLogLog data sketches that provide improved relative error behavior by eliminating a cardinality range dependent bias of the relative error. A new analysis method for HyperLogLog data structures is shown that uses maximum likelihood analysis methods on a Poisson based approximated probability model. In addition, a variant of the new analysis model is disclosed that uses multiple HyperLogLog data structured to directly provide estimation results for set operations like intersections or relative complement directly from the HyperLogLog input data.

18 Claims, 13 Drawing Sheets

Exemplary Cardinality Estimation System Applied on Agent Monitored Transaction Executions

(56) References Cited

U.S. PATENT DOCUMENTS

| | | |
|---|---|---|
| 2015/0269178 A1 | 9/2015 | Rhodes |
| 2017/0039554 A1 | 2/2017 | Greifeneder et al. |
| 2017/0178165 A1* | 6/2017 | Davey-Rogers ... G06Q 30/0205 |

* cited by examiner

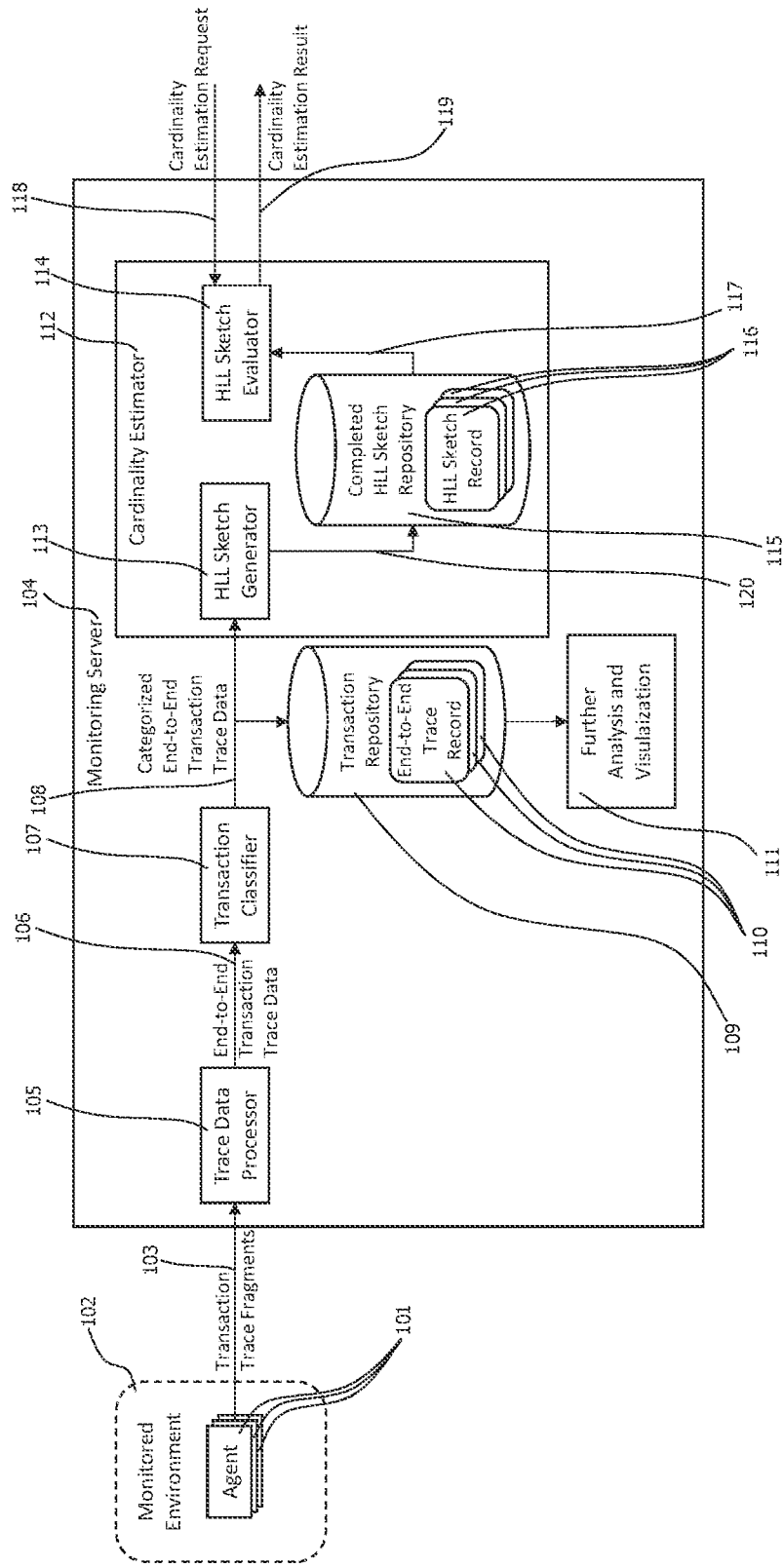

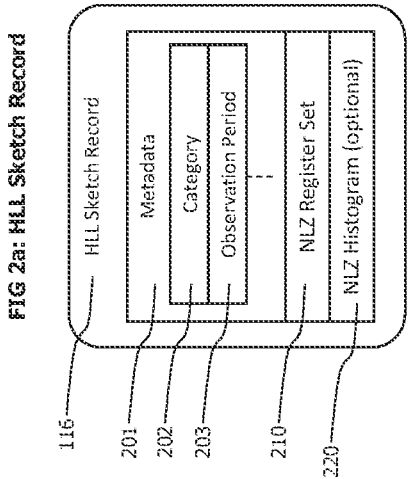
FIG 2a: HLL Sketch Record
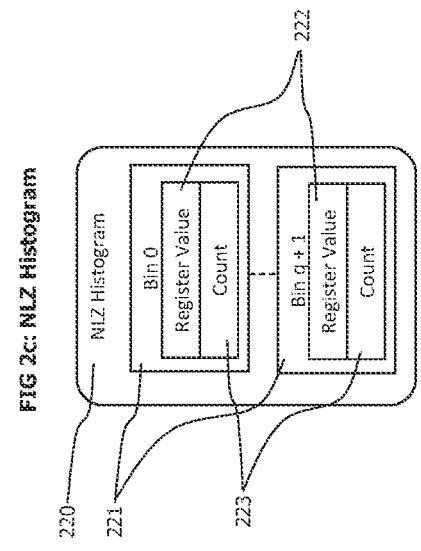
FIG 2c: NLZ Histogram
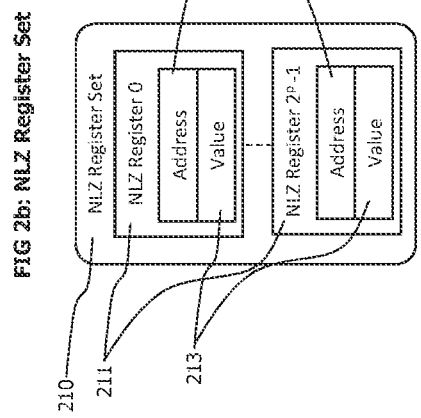
FIG 2b: NLZ Register Set

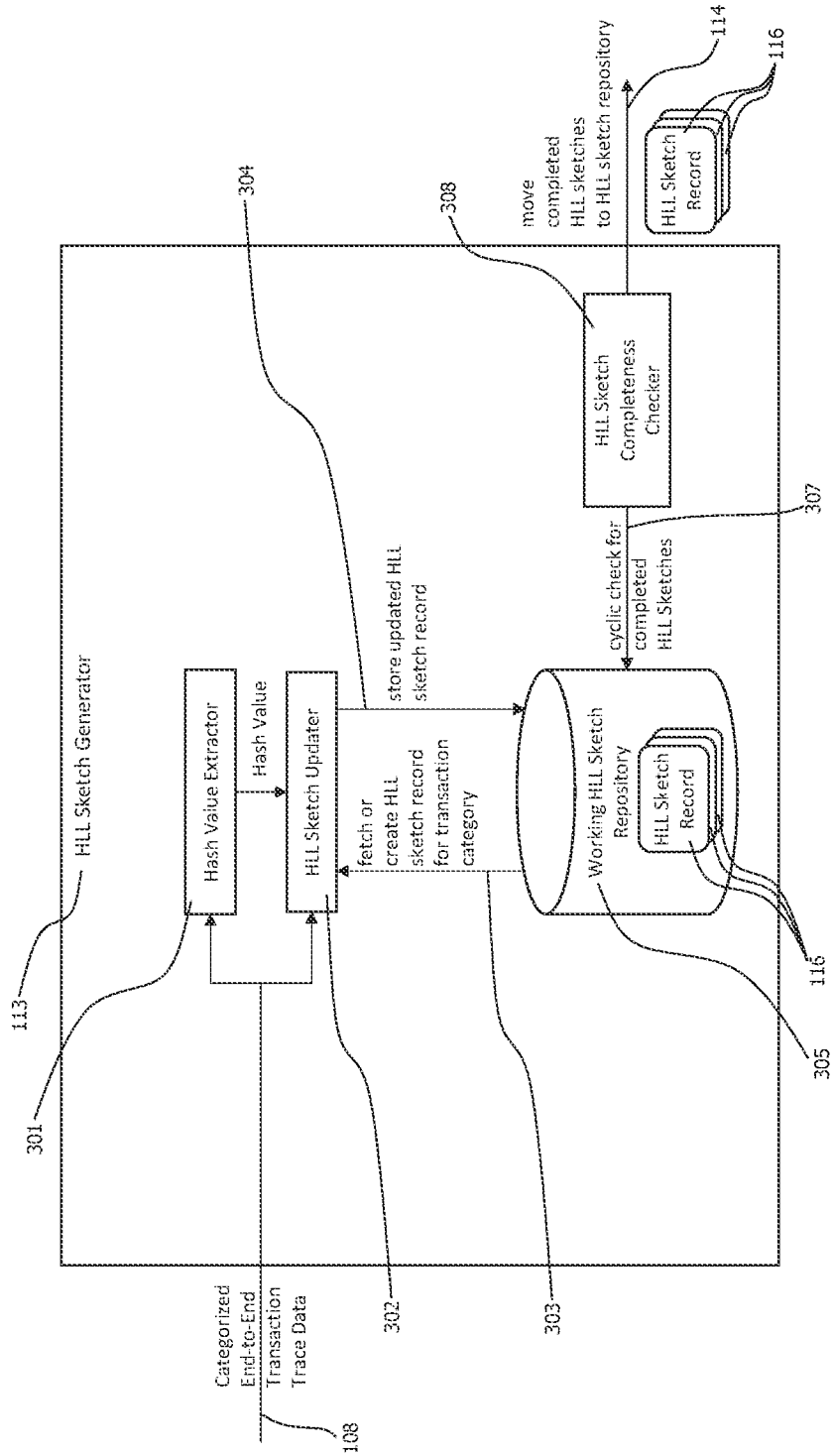

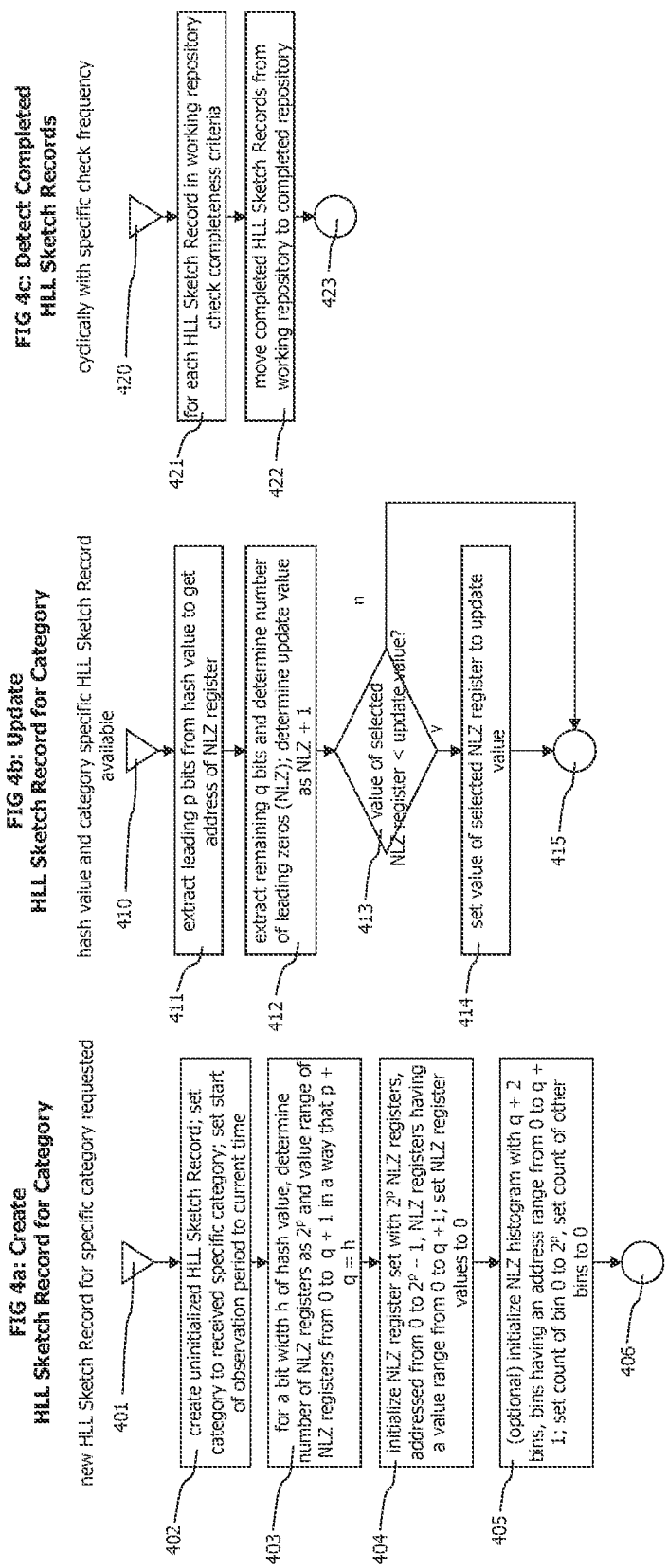

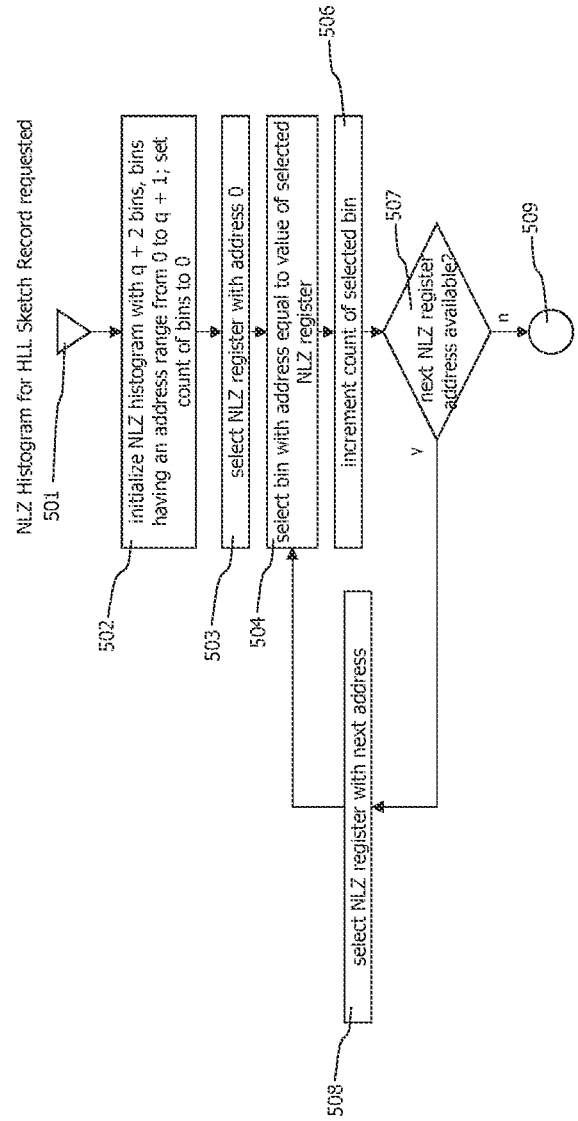

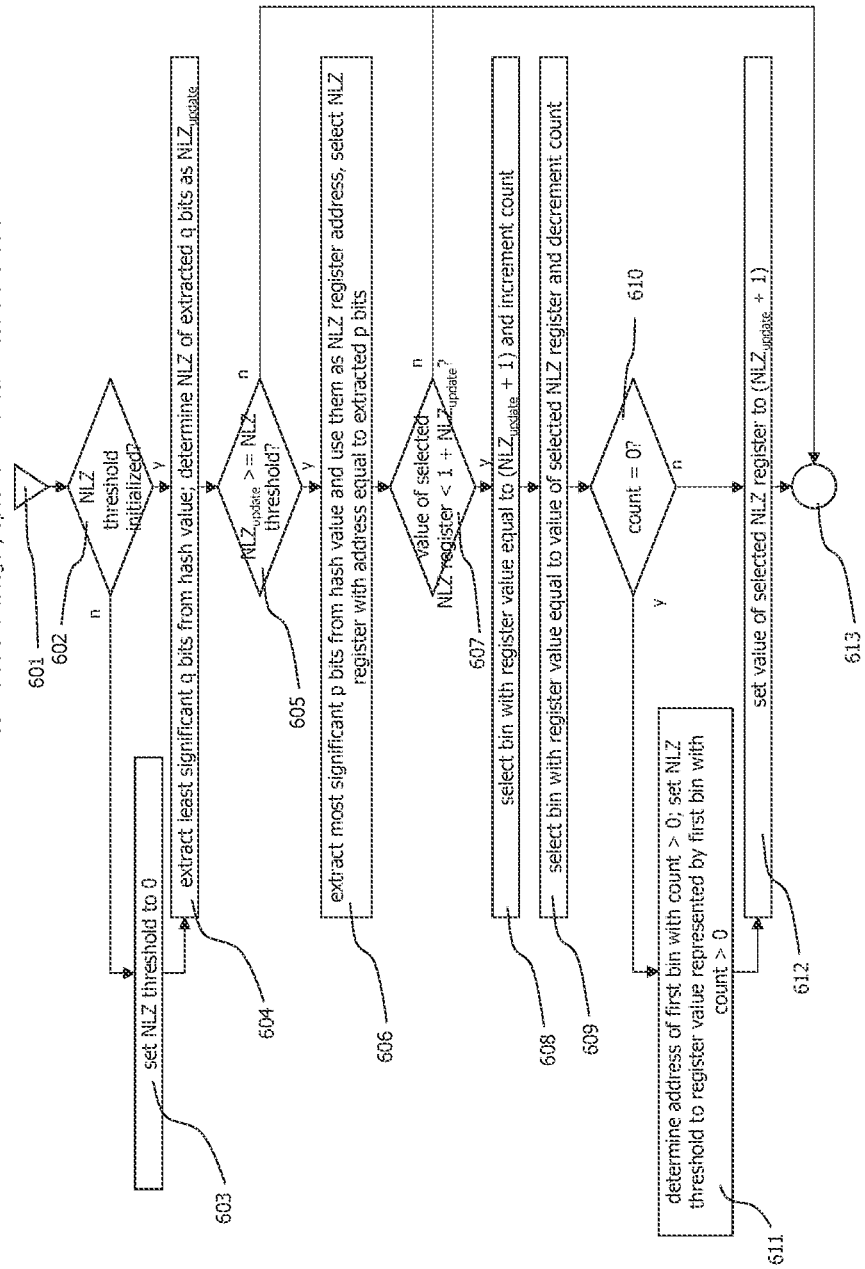

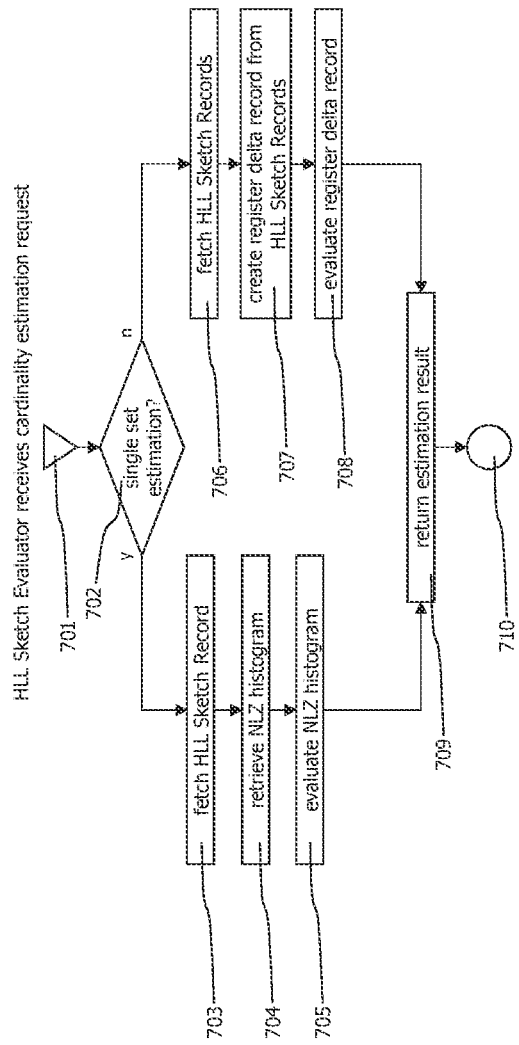

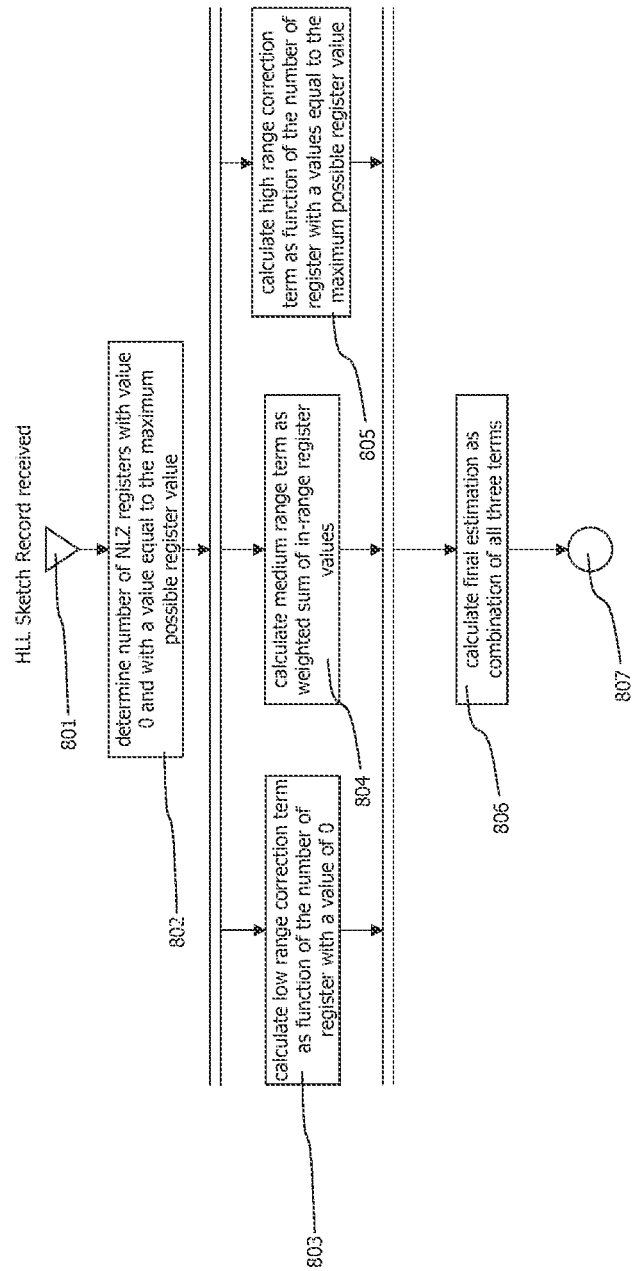

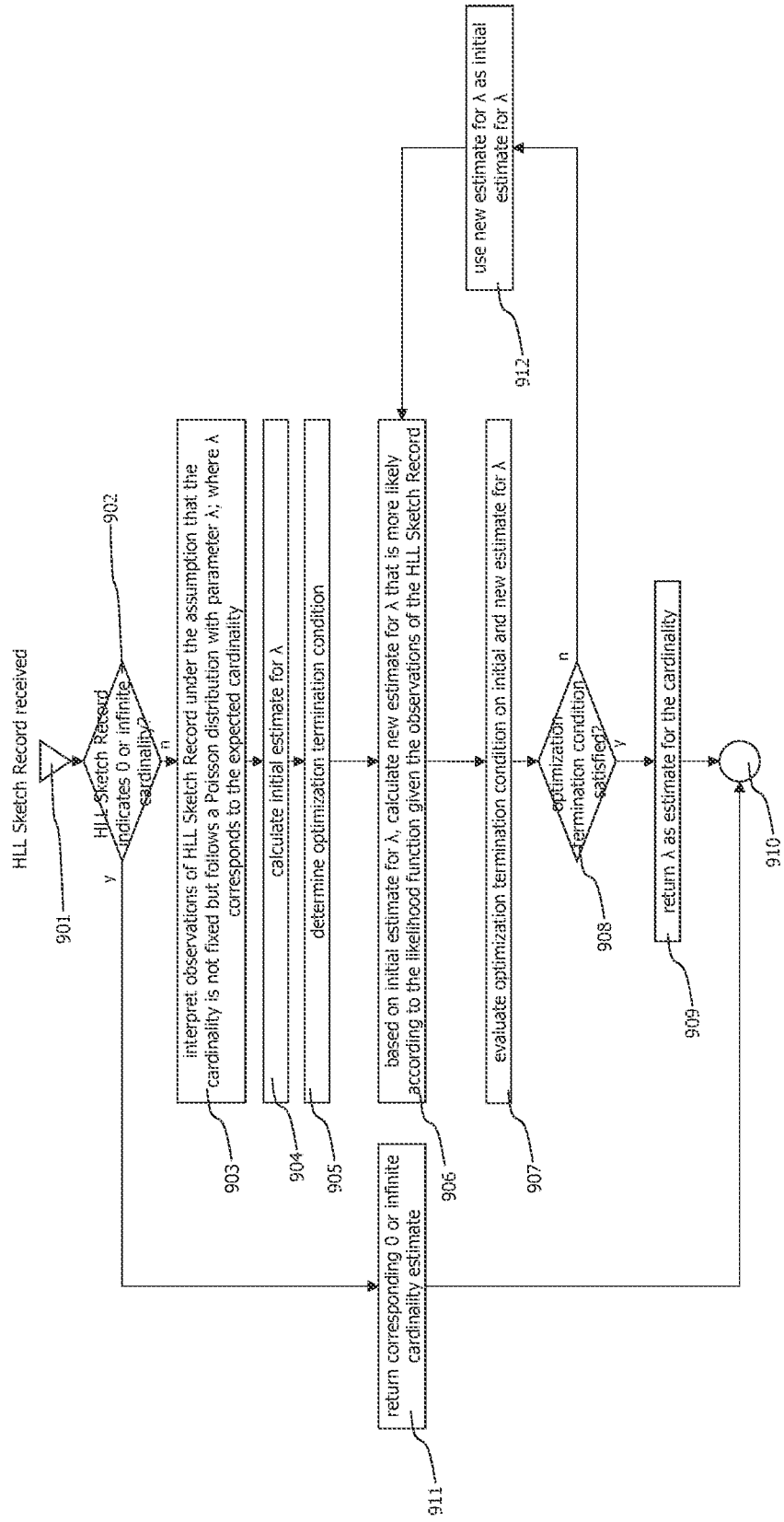

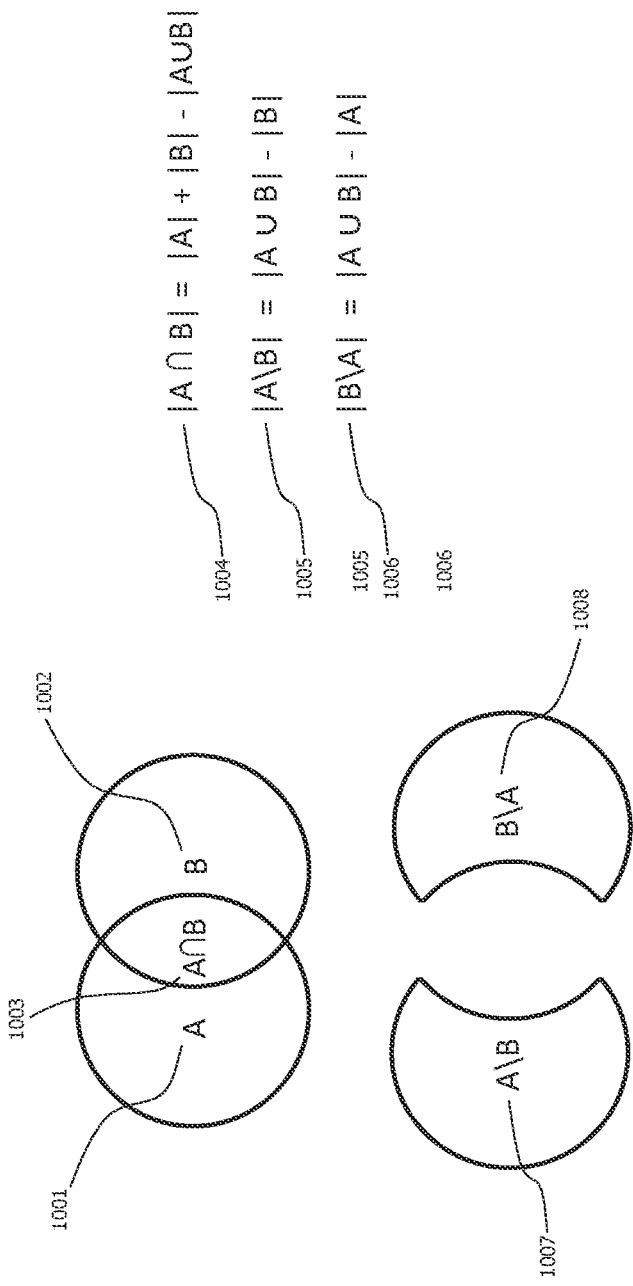
FIG 10: Set Operation Visualizations and Set Operation Cardinality Calculations Based on Inclusion-Exclusion Principle

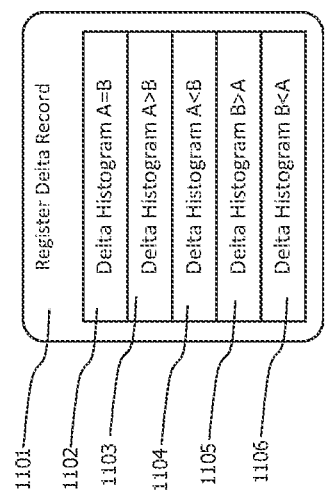
FIG 11: Register Delta Record

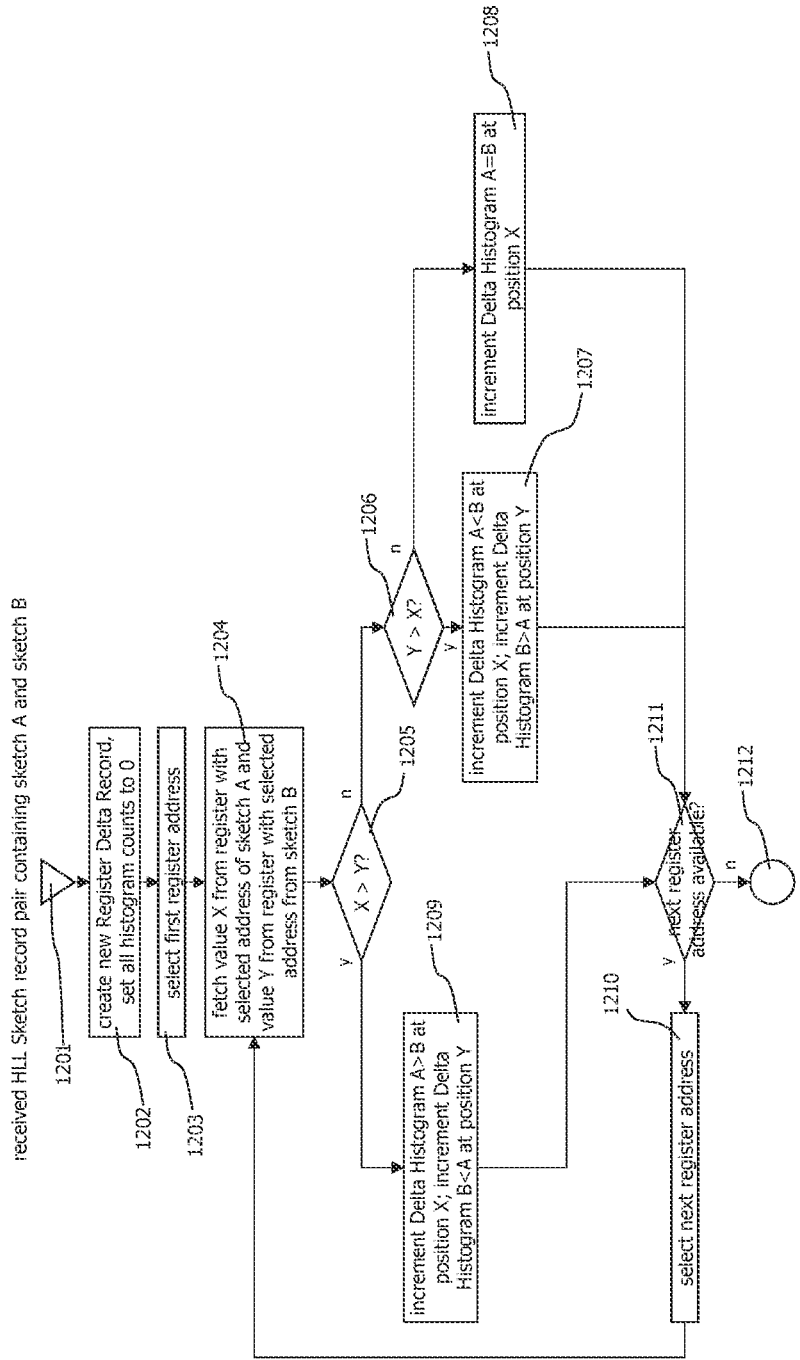

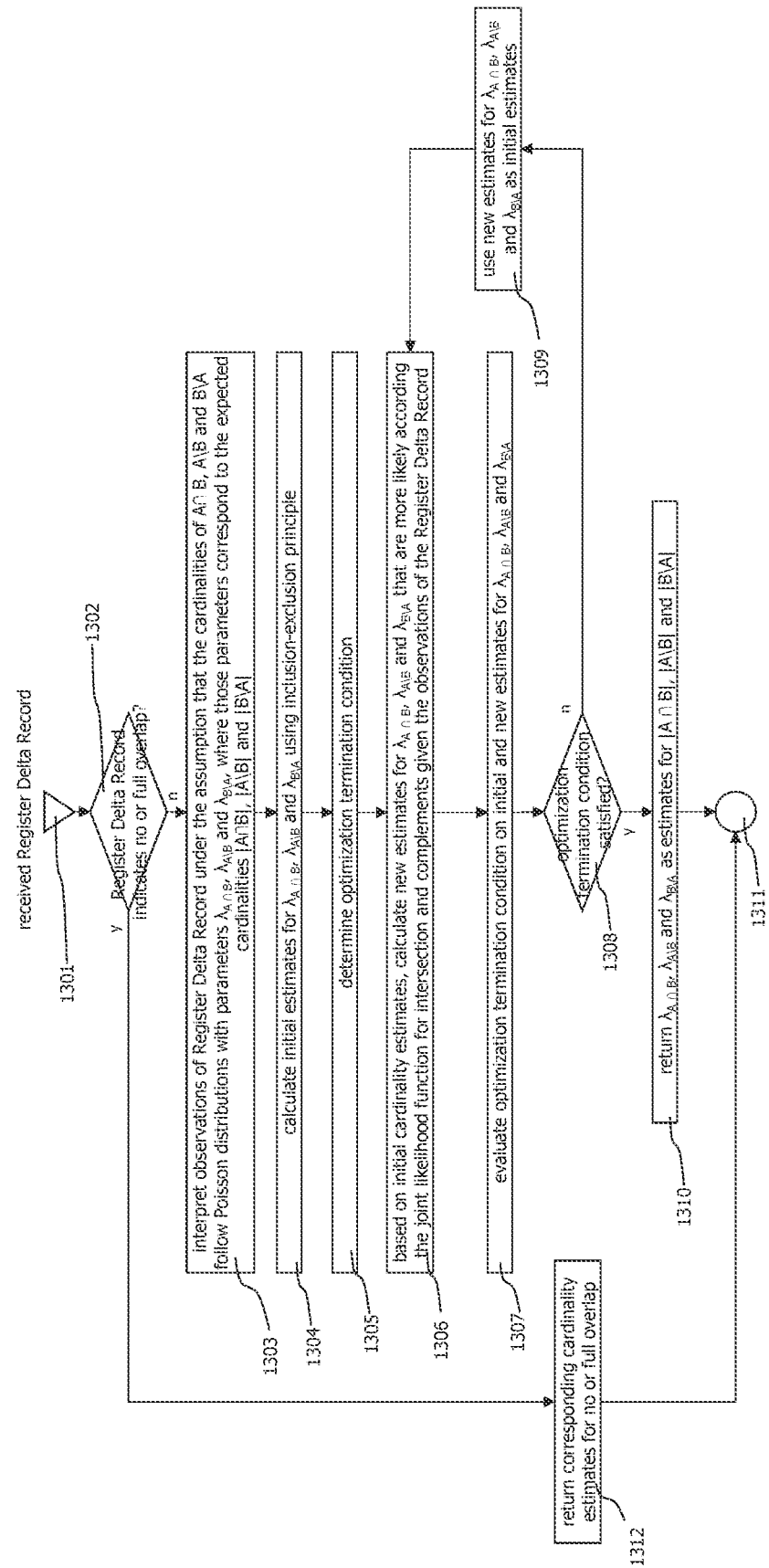

METHOD AND SYSTEM TO ESTIMATE THE CARDINALITY OF SETS AND SET OPERATION RESULTS FROM SINGLE AND MULTIPLE HYPERLOGLOG SKETCHES

CROSS-REFERENCE TO RELATED APPLICATIONS

This application is a continuation of U.S. patent application Ser. No. 15/950,632, filed on Apr. 11, 2018, which claims the benefit of U.S. Provisional Application No. 62/485,439 filed on Apr. 14, 2017. The entire disclosures of the above applications are incorporated herein by reference.

FIELD

This invention generally relates to the estimation of the cardinality of data streams using probabilistic data structures and specifically to an enhanced evaluation of HyperLogLog data structures.

BACKGROUND

The efficiency of agent-based transaction monitoring and tracing systems as improved over the last years in a way that such monitoring systems now allow an always on, all transactions type of monitoring. Such a monitoring system is exemplarily described in U.S. Pat. No. 8,234,631 "Method and System for Tracing Individual Transactions at the Granularity Level of Method Calls Throughout Distributed Heterogeneous Applications without Source Code Modifications" by Greifeneder et al. which is incorporated herein in its entirety. This comprehensive type of monitoring is a great source of information to judge the operating conditions of a monitored system in terms of performance and behavior.

The amount and diversity of the data captured and created by those monitoring systems make it a valuable source not only for application operation monitoring purposes but also as input for business decisions. As an example, transaction trace data may contain data identifying the user that triggered the transaction and the geolocation of this user. A business intelligence related analysis may determine the number of different users or cardinality of users per geolocation before and after certain marketing activities to measure the efficiency of those marketing activities. A large amount of business intelligence analysis problems is based on the cardinalities of specific sets, like the number of different users using a specific service, the number of different products viewed or purchased during a specific period of time and similar. The large amount of transaction trace data and the distributed processing and creation of this transaction trace data, as it is used by modern monitoring systems to cope with the enormous transaction load handled by monitored systems, makes it difficult or even impossible to exactly calculate the set cardinalities required for those business analysis tasks. Fortunately, most analysis tasks do not require exact cardinalities and also work reliable with a relatively exact cardinality estimate with predictable estimation error behavior.

The current state-of-the-art approach for estimating cardinalities of multi-sets in such setups is the HyperLogLog or HLL algorithm. In principle, the HLL algorithm maintains a set of registers (HLL sketch) and uses a hash value generated out of monitored data elements to update the values of those registers. A first portion of the hash value is used as the address for a specific register of the register set. The number of leading zeros bits of the second portion of the hash value is determined and used to calculate an update value for the selected register. The selected register is updated if the calculated update value is higher than the current register value. The state of the registers can be used to estimate the cardinality of the monitored stream.

The HLL estimator shows a relatively good estimation error behavior for cardinalities in the middle range of the cardinality domain, but it shows an increased and biased error in the extreme upper and lower area of the cardinality range. Some known approaches to correct this undesired error behavior include using heuristic correction factors to adapt cardinality estimation results in the extreme ranges. Other approaches combine the HLL estimator with other estimators, like e.g. a linear counting estimator, that provide a better error behavior in the extreme value ranges. Based on the estimation result of the HLL estimator, either the HLL result is used, or, in case the HLL result lies in an extreme cardinality range, the result of the other estimator is used. Those approaches basically address the shortcomings of the current HLL estimation algorithm, but they still show severe shortcomings. First, an approach based on heuristics correction factors relies on the quality of those correction factors which is hard or even difficult to verify. Further, those correction factors may need to be adapted to specific HLL setups or applications. Approaches using a combined estimation approach need to calculate multiple separate estimation values which increases the CPU and memory requirements of those approaches. In addition, those approaches still show an inacceptable error behavior in the cardinality range transition areas in which combined estimator switches from one estimator to the other. An example for such a combined estimator can be found in U.S. patent application Ser. No. 14/218,818 "System and Method for Enhanced Accuracy Cardinality Estimation" by Lee Rhodes.

Next to the plain estimation of set cardinalities, business analysis methods also require cardinality estimations for set operation results like unions, intersections or the relative complement of sets. An estimation for cardinality of the union of two sets represented by two HLL sketches may relatively easy be obtained from a HLL sketch created by merging both original sketches. Merging of the HLL sketches is performed by selecting the higher register value of both original sketches for each register address and using this higher register value for the merged sketch. Cardinality estimates for subtractive set operations, like intersection or relative complement are not directly supported by HLL sketches. The current approach to get estimates for those set operations uses the ability of the HLL estimator to estimate the cardinality of set unions in conclusion with the "inclusion-exclusion" principle. The "inclusion-exclusion" principle states that the cardinality of the union of the two sets A and B equals the cardinality of set A plus the cardinality of set B minus the cardinality of the intersection of A and B. As the HLL estimator provides estimates for the cardinalities of A, B and the union of A and B, the inclusion-exclusion principle may be used to calculate the cardinality of A intersected with B by subtracting the cardinality of A and B from the cardinality of the union of A and B. Although the quality of the estimation results achieved by this approach is sufficient for some applications the accuracy of these estimation results is not as good as it could, partly because it is based on multiple cardinality estimates and the estimation error accumulates and partially because the inclusion-exclusion principle based approach only take advantage of a subset of the information available in the input HLL sketches.

Consequently, there is need in the art for approaches that are capable to provide HLL sketch based cardinality estimations with a constant and predictable relative estimation error over the whole cardinality range. In addition, approaches are required that directly use a combination of different HLL sketches to calculate cardinality estimate for set operations like intersection or relative compliment to reduce the estimation error.

This section provides background information related to the present disclosure which is not necessarily prior art.

SUMMARY

This section provides a general summary of the disclosure, and is not a comprehensive disclosure of its full scope or all of its features.

The present disclosure addresses known shortcomings of HLL analysis method known in the art, like a biased estimation error in extreme cardinality ranges or missing direct support for the cardinality estimation of set operation results like intersections or relative complements.

Embodiments of the present disclosure create histogram or sufficient statistic data from existing HLL data structures. This histogram data may then be used to determine the number of registers in a HLL data structure that received no update and the number of registers that received more updates than the maximal number of recordable updates. Those numbers are used as input to calculate correction terms for low and high cardinality ranges. The remaining histogram data is used to calculate a raw estimation value which is then combined with the calculated correction terms for high and low cardinality ranges to create a final cardinality estimation value.

Variants of this embodiments create the histogram or sufficient statistic data while the HLL data structure receives updates, and use the histogram data for a fast and efficient determination if a given update to a HLL data structure does not change the state of the HLL data structure and can thus be ignored.

Other embodiments of the present disclosure use the extracted histogram data as input for a cardinality estimation method based on a maximum likelihood approach. In principle, a maximum likelihood approach estimates those parameters of a statistical distribution (e.g. a cardinality estimate) that has the highest plausibility for a given set of observed data (e.g. a histogram calculated form a given HLL data structure). The statistical model describing HLL data structures is difficult to evaluate, basically because the probability mass function describing that a given HLL register has a given value depends on the values of all other HLL registers. To overcome this, a statistical model is selected that approximates the original combined probability function for a HLL data structure with a tolerable approximation error and that provides independent probability mass functions for all registers. Variants of those embodiments use a Poisson model as an approximation of the real probability model for HLL data structures to get a probability model that is better suitable for a maximum likelihood based evaluation.

Yet other embodiments analyze multiple HLL data structures describing different, comparable sets (e.g. set users of a given e-commerce applications during one time interval versus users of the same application from another time interval) and generate differential histogram data as input for a maximum likelihood based analysis that provides cardinality estimations for various set operation results executed on the observed sets, like intersection or relative complements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a block diagram of an agent based monitoring system that monitors transaction executions, identifies transaction categories and creates probabilistic data structures, like HLL sketches that may be used to estimate the cardinality of identified transaction categories.

FIGS. 2a-c provides data records that may be used to store HLL sketch data.

FIG. 3 depicts a block diagram of a HLL sketch generator that generates HLL sketches out of received categorized end-to-end transaction traces.

FIGS. 4a-c shows flow charts describing the processing of received categorized end-to-end transaction traces to create corresponding HLL sketch records.

FIG. 5 contains a flow chart describing the extraction of a register value histogram from the registers of a HLL sketch.

FIG. 6 depicts flow chart showing an optimized process for the combined update of HLL register and histogram data.

FIG. 7 conceptually describes the handling of a request for an estimation of the cardinality of a specific transaction category or of the cardinality of a set operation result based on multiple transaction categories.

FIG. 8 shows a flow chart describing the evaluation of a HLL sketch considering registers that received no update and registers that received more than recordable updates.

FIG. 9 provides a flow chart that conceptually describes the evaluation of a HLL sketch using a Maximum Likelihood method on a Poisson approximated probability function parameterized with data derived from the HLL sketch.

FIG. 10 visually describes the exclusion-inclusion principle.

FIG. 11 shows data records that may be used to store delta histogram data extracted from two HLL sketches.

FIG. 12 shows a flow chart describing the creation of a register delta record out of two HLL sketches representing different sets.

FIG. 13 shows a flow chart describing a Maximum Likelihood/Poisson approximation based evaluation of a register delta record to calculate cardinality estimates for set operation results.

Corresponding reference numerals indicate corresponding parts throughout the several views of the drawings.

DETAILED DESCRIPTION

Example embodiments will now be described more fully with reference to the accompanying drawings.

The described embodiments are directed to monitoring systems that are capable to provide set cardinality estimations for large sets of transaction trace data in real-time or near real-time, with small and predictable memory consumption caused by the cardinality estimation processing.

An enhancement to existing HLL data evaluation method is presented, that first summarizes the observations presented by a HLL data structure by creating a histogram of the data representing frequency of individual register values. The histogram data is used to calculate both a cardinality estimation value and correction terms for cardinalities in the extreme high or low value ranges.

Further, an alternative evaluation method for HLL data records is presented that uses maximum likelihood method combined with a HLL data interpretation based on a Poisson approximation model to get bias free estimation results combined with a slightly better estimation accuracy. A variant of the maximum likelihood based cardinality estimation method is shown that uses differential histogram data extracted out of two or more HLL data records describing different sets to calculate cardinality estimations for set operation results directly from the differential histogram data. The present cardinality estimation method for set operation results does not require post-estimation calculations on estimation results that potentially increase the estimation error.

Although the disclosed enhanced interpretation methods for HLL data records are exemplary presented in the scope of the interpretation and analysis of sets of transaction trace records provided by agent based transaction monitoring systems, those enhancements are independent of this specific domain and may be practiced in various other areas without departing from the spirit and scope of the present invention. Exemplary areas on which the disclosed technologies may be used include the determination of unique search queries e.g. processed by an internet search server, number of unique SQL statements processed by a database server or the determination of unique log lines in log files.

Referring now to FIG. 1 which provides an overview of an agent based transaction tracing and monitoring system including a cardinality estimation module. Agents 101 are deployed to a monitored environment 102, e.g. in form of in-process agents to monitor transaction executions performed within the monitored applications. The agents may provide their monitoring data in form of transaction trace fragments 103, which may be received, processed and correlated by a trace data processor 105 that is operated by a remote monitoring server 104. Deployment and operation of agent 101 and correlation transaction trace fragments 103 to create end-to-end transaction data may be performed according to the teachings of U.S. Pat. No. 8,234,631 "Method and System for Tracing Individual Transactions at the Granularity Level of Method Calls Throughout Distributed Heterogeneous Applications without Source Code Modifications" by Greifeneder et al. and of U.S. Pat. No. 8,151,277 "Method and System for Dynamic Remote Injection of In-Process Agents Into Virtual Machine Based Applications" by Greifeneder et al. which are both incorporated herein by reference in their entirety.

The created end-to-end transaction trace data may be analyzed by a transaction classifier 107 to identify transaction categories and to mark end-to-end transaction trace data with data identifying the categories to which the transactions match, to create categorized end-to-end transaction trace data 108. The transaction classifier may operate according to the teachings of U.S. patent application Ser. No. 15/227,029 "Method and System for Real-Time, Load-Driven, Multidimensional and Hierarchical Classification of Monitored Transaction Executions for Visualization and Analysis Tasks Like Statistical Anomaly Detection" by Greifeneder et al. which is incorporated herein by reference in its entirety. The categorized end-to-end transaction trace data may be stored in transaction repository 109 which may be accessed by further analysis and visualization modules to e.g. identify anomalies in transaction executions and to determine potential causal relationships between identified anomalies.

The categorized end-to-end transaction trace data may further be forwarded to a HLL sketch generator 113 of a cardinality estimator module 112. The HLL sketch generator 113 may receive a categorized end-to-end transaction trace, use the category data of the received end-to-end transaction record to determine the observed sets for which the received end-to-end transaction is relevant further fetch the HLL sketch data records corresponding to those sets and use data extracted from the received end-to-end transaction trace record to update those HLL sketch data records. The HLL sketch generator may further determine if HLL sketch data records 116 are completed and move 120 completed HLL sketches to a completed HLL sketch repository 115. The determination of the completion status of a HLL sketch may e.g. be performed based on an elapsed observation time or the number of observed transactions corresponding to the set described by HLL sketch.

A HLL sketch evaluator 114, which may also be a part of the cardinality estimator module 112, may receive cardinality estimation requests 118 and may in response to such requests determine and fetch the HLL sketch records corresponding to the sets for which cardinality estimations are requested. The HLL sketch evaluator may then evaluate the fetched HLL sketch records to calculate a cardinality estimation result which may then be returned by the HLL sketch evaluator in form of a cardinality estimation result 119.

Coming now to FIG. 2 which conceptually shows data records that may be used to store original recorded HLL sketch data and histogram data generated out of the recorded HLL sketch data. A HLL sketch data record 116 as depicted in FIG. 2a may contain but is not limited to a metadata section 201 which contains data describing the observed set, a NLZ (number of leading zeros) register set 210 and an optional NLZ histogram 220 which may be used to store the frequency of NLZ values. The metadata section 201 may contain but is not limited to a transaction category 202 defining a set of transactions described by the HLL sketch and an observation period 203 which specifies the time period during which transactions executions were recorded by the HLL sketch. A NLZ register set 210 as shown in detail in FIG. 2b contains a set of addressable NLZ registers 210, where a NLZ register may contain but is not limited to an address 212, which uniquely identifies a NLZ register within a NLZ register set, and a value field 213 that may be used to store the highest number of leading zeros seen in an update value for a specific NLZ register. More precisely, to determine the NLZ value for a given update value, the binary form of a received update value may be examined and the number of leading zero bits of the binary form of the update value are counted to determine the NLZ value. The internal structure of a NLZ histogram 220 is shown in FIG. 2c. Such a NLZ histogram consists in a set of bins 221, where a separate bin exists for each possible NLZ register value. A bin 221 may contain but is not limited to a register value field 222 identifying a specific NLZ value, and a count field, representing the number of NLZ registers in a corresponding NLZ register set 210 having this value. NLZ register addresses of a NLZ register set are continuous and cover the whole range of register addresses that a HLL sketch record can receive. The bins 221 of a NLZ histogram are also continuous and cover the whole value range of NLZ registers 221 of a corresponding NLZ register set.

A block diagram showing the internal components of a HLL sketch generator 113 is shown in FIG. 3. A HLL sketch generator consists in a hash value extractor 301, which receives categorized end-to-end transaction trace data, extracts data representing the set that should be observed (e.g. a user identifier if the set of unique users executing transactions should be monitored, an identifier for a geographic location if the geographic locations of users executing transactions should be monitored, other set defining data or a combination of multiple set defining properties of transactions). The hash value extractor then calculates a corresponding numeric value or hash value representing the extracted data. The created hash value has a fixed length and the extracted data and corresponding hash values represent a mapping in which each specific extracted data record maps to exactly one hash value, but multiple extracted data records may map to the same hash value (hash collision). Creating of hash values out of input data is a concept well known in the art. A good overview of this concept may e.g. be found on https://en.wikipedia.org/wiki/Hash_function. It is noteworthy that it is not necessary that the function used by the hash value extractor is a hash function, if the used function fulfills following requirements. First, the used function needs to map input data of various size to numeric values with a fixed size (e.g. 32 bit, 64 bit); second, the function needs to be deterministic, i.e. for a given input value it must always create the same output value; third the function should map input values evenly to the value range of the outvalue, i.e. every value of the output range should have the same probability and fourth, the probability of collisions, i.e. the generation of the same output value for two different input values should be minimal. Thus, other types of encoding functions fall with broader aspects of this disclosure.

A HLL sketch updater module 302 of the HLL sketch generator 113 receives both the incoming categorized end-to-end transaction trace data 108 and the corresponding hash value created by the hash value generator 301 and uses the category data of the received transaction trace data to fetch a matching HLL sketch record 116 from a working HLL sketch repository 305 or to create a new HLL sketch record with matching category data 202 if no one is available in the working HLL sketch repository 305. Afterwards, the HLL sketch updater 302 updates the fetched or created HLL sketch according to the received hash value and stores the updated HLL sketch in the working HLL sketch repository 305. For a detailed description of the HLL sketch record update process, please see FIG. 4b or FIG. 6.

A HLL sketch completeness check executed by the HLL sketch completeness checker 308 is cyclically performed on HLL sketch records existing in the working HLL sketch repository 305. The HLL sketch completeness check uses data stored in HLL sketch records 116, like e.g. the specified observation period 203 to determine if HLL sketch records are finished and should not receive further updates. The HLL sketch completeness checker moves such finished HLL sketch records from the working HLL sketch repository 305 to the completed HLL sketch repository 115 to make them available for cardinality estimation requests 118.

Flowcharts of processes performed by the HLL sketch updater and the HLL sketch completeness checker are depicted in FIG. 4. FIG. 4a shows the processing steps performed by the HLL sketch updater in response to the unavailability of a requested HLL sketch record in the working HLL sketch repository. In this case, the process to create a new HLL sketch record is initiated with step 401 and subsequent step 402 creates a new HLL sketch record 116, sets the category 202 to the category for which a HLL sketch record 116 was requested and set the start of the observation period 203 to the current time. Afterwards, step 402 is executed which determines the number of NLZ registers 211 and the value range of those registers depending on the bit width of the hash values generated by the hash value extractor. It is noteworthy that as consequence to the fixed length of the hash value, also the bit width of the hash value is constant. The HLL algorithm uses a subset p of the bits contained in the hash code as address of a specific NLZ register. As p bits are capable to represent an address range of $2^p$, the number of required NLZ registers in the register set is $2^p$. The remaining q bits contained in the hash code are used to generate update values for addressed NLZ register. This update value is calculated by determining the number of leading zero bits of the remaining q bits and incrementing this determined number by one. The highest possible update value of q+1 is calculated when all remaining q bits are zero. Consequently, the value range of the NLZ registers must be equal or greater than (q+1). It is noteworthy that the bit width of NLZ registers is much smaller than q (in best case the bit width of NLZ registers is $\log_2 (q+2)$) because the NLZ registers do not need to cover the whole value range of q bits, but only the value range from 0 to q+1. After the number of required NLZ registers and the value range of those registers have been determined in step 403, subsequent step 404 is executed which initializes a NLZ register set with $2^p$ NLZ registers, where the value range of the value field 213 of the NLZ registers is from 0 to q+1. The values 213 of all created NLZ registers are set to 0.

Some variants of the present embodiments, which maintain NLZ histogram generation while the HLL sketch update process is ongoing, may further execute a step 405, which initializes a HLL histogram 220 of the new created HLL sketch record 116. Step 405 initializes the HLL histogram with q+2 bins 221 to cover the whole NLZ register value range. The register values 222 of those bins are set to values from 0 to q+1, to get one bin for each possible register value. Further, the count 223 of bin with register value 0 is set to $2^p$ and the counts of all other bins are set to 0 to represent the current state of the NLZ registers which were all initialized with the value 0. The process then ends with step 406.

Referring now to FIG. 4b which explains the processing performed to update a HLL sketch record with a received hash value. The process starts with step 410 when an available hash value and a HLL sketch with category data matching the category data of the trace data record which was used to create the hash value. Following step 411 extracts the leading p bits from the hash value and interprets those p bits as address of a NLZ register in the NLZ register set of the HLL sketch record to fetch the NLZ register corresponding to the value of the extracted leading p bits. Afterwards step 412 determines an update value for the register as 1 plus the number of zero bits of the remaining q bits of the hash value (short example: for a q bit sequence "00010010", the number of leading zeros would be 3, because the sequence shows 3 "0" bits before the first "1" bit). Following decision step 413 compares the current value of the register selected in step 411 with the update value calculated in step 412. In case the update value is greater than the current value of the selected NLZ register, the value of the NLZ register is set to the update value. Otherwise, the update value is discarded and NLZ register value is not changed. The process then ends with step 415.

Coming now to FIG. 4c which illustrates the process to identify completed HLL sketch records. The process starts cyclic with step 420, e.g. when a specific time has elapsed (e.g. every 10 second, every minute). Subsequent step 421 checks for each HLL sketch record in the working HLL sketch repository if the completeness criteria for the individual HLL sketches are fulfilled. Those completeness criteria may include a check if a specific observation time has elapsed or a check if a specific number of desired transaction observations has been reached. Afterward, step 422 fetches those HLL records for which the completeness criteria check indicated that HLL sketch is completed and ready for interpretation and moves the fetched HLL records from the working HLL sketch repository to the completed HLL sketch repository. The process then ends with step 423.

The calculation of a NLZ histogram from a completed HLL sketch record is described in the flow chart shown in FIG. 5. The process is started with step 501 when a NLZ histogram for a completed HLL sketch record is requested. Subsequent step 502 creates a NLZ histogram matching the number of NLZ registers and their value range, e.g. by creating a NLZ histogram with q+2 bins, where q represents the maximum value of a NLZ register. The count is set to 0 for all bins. Following step 503 selects the NLZ register with address 0 and subsequent selects the bin 221 with address or register value 222 equal to the value 213 stored in the selected NLZ register. Afterwards step 506 increments the count value 223 of the selected bin by one. Following decision step 507 checks if more NLZ registers are available in the NLZ register set. In case more NLZ registers are available, the process continues with step 508 which selects the next NLZ register. Afterwards, the process continues with step 504. In case step 507 determines that no more NLZ registers are available in the NLZ register set of the processed HLL sketch record, the NLZ histogram is complete and the process ends with step 509. A NLZ histogram represents a compressed version of observation data stored in the NLZ registers. It eliminates data not required for the subsequent cardinality estimation task (e.g. which specific NLZ register has which specific value) and only keeps data that is required for the estimation task (e.g. number of NLZ registers with a specific value. Such a compaction of observation data into a form that only contains data required by a specific subsequent analysis task is also referred to creating a "sufficient statistic" with respect to the specific analysis task. The compression step is lossless for the analysis task because it only removes data that has no impact on the analysis, but it may substantially decrease the computational cost of the analysis because it operates on a condensed and possibly optimized data set.

FIG. 6 contains the flow chart of an optimized HLL sketch update process that simultaneously updates NLZ registers and NLZ histogram and that uses NLZ histogram data for an early determination if a received hash value has no impact on the state of the HLL sketch record and can therefore be discarded. The process starts with step 601, when a hash value and a HLL sketch record which should be updated according to the received hash value are available. Following step 602 checks if the NLZ threshold for the received HLL sketch record is initialized. In case the NLZ threshold is not initialized, step 603 is executed which initializes the NLZ threshold with the value 0. A prerequisite for this combined NLZ register and NLZ histogram update is an initialization of the HLL sketch record that includes the initialization of the NLZ register as described in step 405 of the process described in FIG. 4a. Afterwards, or if the NLZ threshold is already initialized, step 604 is executed. It is noteworthy that the NLZ threshold of a HLL sketch record is updated and accessed by multiple, sequential executions of the HLL sketch update process. It may therefore useful to store the NLZ threshold as part of the HLL sketch record.

Step 604 extracts the least significant q bits from the received hash value and determines the NLZ (number of leading zero bits) of those q bits. Following decision step 605 checks if the determined NLZ is greater or equal than the NLZ threshold. In case the determined NLZ is smaller than the NLZ threshold, the process ends with step 613. The NLZ threshold is set to the minimal value stored in a NLZ register (at the beginning of the recording this is 0, therefore the NLZ threshold is initialized with 0). A determined NLZ that is smaller than the NLZ threshold could therefore not cause an update to any NLZ register and can consequently be ignored.

In case the determined NLZ is greater or equal than the NLZ threshold, the processing continues with step 606, which extracts the most significant p from the received hash value, interprets those p bits as address of an NLZ register and selects the addressed NLZ register. Following decision step 607 determines if the value 213 of the selected NLZ register is smaller than 1+the NLZ determined in step 604. In case the register value is not smaller, the process ends with step 613. Otherwise the process continues with step 608, which selects the bin 221 of the NLZ histogram representing calculated update value (1+the NLZ determined in step 604) and increments the count 223 of this bin and subsequent step 609 selects the bin with register value equal to the current value of the selected NLZ register and decrements its count. Following decision step 610 checks if the count value reached 0 after the decrement. In case the count is now 0, step 611 is executed, otherwise the process continues with step 612. Step 611 determines the first bin (i.e. the bin representing the lowest register value) that has a count >0. At the beginning, all NLZ registers have the value of 0, the count of the bin corresponding to register value 0 is $2^p$ and the count of all other bins is 0. With continuous HLL sketch updates, the values of all registers receive updates and therefore also the counts of the bins in the histogram will change, until bins representing value 0 or 1 etc. will get 0. If the histogram indicates that all registers have a value higher than a specific value (i.e. all bins from the bin representing the value 0 to the bin representing the value n have a count of 0), then register updates having a lower value than n cannot change the value of any register and can therefore be ignored. After the first bin with a count >0 has been determined by step 611, the NLZ threshold is set to the register value represented by this bin.

Subsequent step 612 updates the value of the selected NLZ register to 1+the NLZ determined in step 604. The process ends with step 613.

Referring now to FIG. 7 which provides a flow chart that conceptually describes the processing of cardinality estimation requests 118 performed by the HLL sketch evaluator 114 to create corresponding cardinality estimation results 119. The process starts with step 701, when a cardinality estimation request 118 is received by the HLL sketch evaluator. Subsequent decision step 702 determines if a cardinality estimation of a single set is requested, or if a cardinality estimation of the result of set operation, like intersection, union relative complement etc., involving multiple sets is requested. In case a cardinality estimation of a single set is requested, step 703 is executed which fetched the HLL sketch record 116 corresponding to the set for which a cardinality estimation was requested from the completed HLL sketch repository 115. Afterwards, step 704 is executed which fetches the NLZ histogram data from the previously retrieved HLL sketch record. Step 704 may either use an already available NLZ histogram in case the HLL update process includes the maintenance of a HLL histogram as described in FIG. 6 or it may calculate a NLZ histogram out of NLZ register values as described in FIG. 5. Following step 705 evaluates the NLZ histogram to calculate an estimation value for the set represented by the HLL sketch record. Evaluation of the NLZ histogram may either be performed by calculating an average register value for registers with a value higher than 0 and lower than q+1 which is combined with correction values that consider the registers with a value of 0 and with a value of q+1, as described in FIG. 8, or it may be performed by interpreting the NLZ histogram data using maximum likelihood methods on an approximated probability model that interprets the NLZ register according to a Poisson model as described in FIG. 9. The cardinality estimation result calculated in step 705 is returned in form of a cardinality estimation response in step 709. The process then ends with step 710.

In case step 702 determines that a cardinality estimation is requested for the result of a set operation based on multiple sets, step 706 is executed which fetches the HLL sketch records 116 representing those sets that represent the input for the set operation. Following step 707 creates a register delta record, which summarizes the differences between the fetched HLL sketches in form of a set of delta histograms. An example for such a register delta record for two HLL sketch records is shown in FIG. 11 and the creation of such a register delta record out of two sets of NLZ registers from two different HLL sketch records is shown in FIG. 12. Following step 708 evaluates the register delta record using maximum likelihood methods to create the desired cardinality estimation for the result of the set operation as specified by the cardinality estimation request. Following step 709 returns the estimation result in form of a cardinality estimation respond and the process then ends with step 710.

Coming now to FIG. 8 containing a flow chart that describes an evaluation method that uses a weighted sum of NLZ register values greater than 0 and smaller than q+1 as basis for a raw cardinality estimation, which is then refined with correction factors that are based on the number of NLZ registers with lower (0) and upper (q+1) bound values. The process starts with step 801, when a HLL sketch record for evaluation also containing NLZ histogram data is received. Following step 802 uses the NLZ histogram data to determine the number of NLZ registers that received no update and still have the initial value of 0 and the number of NLZ registers that have a saturated value of q+1. Following steps 803, 804 and 805 may be executed in parallel to calculate a low range correction value depending on the number of NLZ registers with value 0, a raw estimation value using NLZ histogram data of registers with a value greater than 0 and smaller than q+1 and a high range correction value using the number of NLZ registers having a value of q+1. The low range correction value may be calculated by step 803 according to equation 1 and equation 2.

$$corr_{low} := m\sigma(count_0/m) \quad (1)$$

$$\sigma(x) := x + \sum_{k=1}^{\infty} x^{2^k} 2^{k-1} \quad (2)$$

The value "m" in equation 1 represents the number of registers (i.e. $2^p$) and $count_0$ (i.e. the number of NLZ registers with value 0). The value of $count_0$ is divided by m and the result is used as input for equation 2 and the result of equation 2 is multiplied by m to create the low cardinality range correction $corr_{low}$.

The weighted sum is calculated by step 804 according to equation 3.

$$est_{weighted} := \sum_{k=1}^{q} count_k 2^{-k}. \quad (3)$$

The high cardinality correction value is calculated by step 805 according equation 4 and equation 5, where an input value for equation 5 is first calculated by dividing $count_{q+1}$ by m and then subtracting this value from 1. The result of equation 5 is then multiplied by m and $2^{-q}$ to get a correction factor for high cardinalities.

$$corr_{high} := m\tau(1 - count_{q+1}/m)2^{-q} \quad (4)$$

$$\tau(x) := \frac{1}{3}\left(1 - x - \sum_{k=1}^{\infty}\left(1 - x^{2^{-k}}\right)^2 2^{-k}\right) \quad (5)$$

After the three terms have been calculated by steps 803 to 805, subsequent step 806 uses equation 6 to calculate a final estimation value. The process then ends with step 807.

$$est_{final} := \frac{\alpha_{\infty} m^2}{corr_{low} + sum_{weighted} + corr_{high}} \quad (6)$$

$\alpha_{\infty}$ may be calculated as $1/(2\ln2)$. For the theoretical motivation of above equations, the mathematical proof showing their validity, simulation results showing their ability to provide correct results and possible numerical optimizations, the reader is kindly referred to the research paper of the inventor available via the GitHub project "oertl/hyperloglog-sketch-estimation-paper" and via the Cornell University Library preprint publication Otmar Ertl, "New cardinality estimation algorithms for HyperLogLog sketches", arXiv preprint:1702.01284 (2017).

Referring now to FIG. 9 which shows a flow chart that conceptually describes the evaluation of HLL sketch records using maximum likelihood methods on an approximated probability model assuming that the number of distinct elements is not fixed but Poisson distributed. The process starts with step 901 when a HLL sketch record for evaluation is available. Subsequent decision step 902 checks if the HLL sketch indicates a cardinality of 0 (i.e. all NLZ register values 0) or infinite (i.e. all NLZ register values q+1). In case the HLL sketch indicates such an extreme cardinality, the process continues with step 911 which indicates a cardinality of 0 or infinite according to the HLL sketch data and the process then ends with step 910. If step 902 otherwise determines that the HLL sketch record neither indicates a cardinality of 0 nor of infinite, the process continues with step 903 which interprets the observation data provided by the HLL sketch record as data obtained after recording a data set whose cardinality is not fixed but is assumed to follow a Poisson distribution with a given mean A. This interpretation is an approximation because the input set has a well-defined cardinality. However, the exact model which assumes that a fixed number of distinct data items are randomly distributed over all registers leads to a dependency between the probability functions for each register which makes the determination and numerical evaluation of an overall probability function for all registers difficult or even impossible. However, it is possible to substitute the fixed size model with a model where the cardinality is described by a Poisson distribution. Under the Poisson approximation, the NLZ register probability mass functions are independent and a set of independent probability functions can be combined into a corresponding overall probability mass function by simple multiplication. Following equation 7 shows the distribution of NLZ register values $NLZ_0, NLZ_1, \ldots, NLZ_{m-1}$ under the assumption that the cardinality of the set described by the NLZ registers is distributed according to a Poisson distribution with mean A. The compact form of the function shows that the whole information contained in a NLZ register set that provides an NLZ value for each specific register is not needed to express the relationship between the mean of the assumed Poisson distribution and the NLZ observations. Only an aggregation of the NLZ register values in form of a NLZ value histogram (see count0 to countq+1 used in equation 7) is required This is an additional indication that the NLZ histogram provides a sufficient statistic to estimate $\lambda$ which is also an estimate for the cardinality.

$$p(NLZ_0, NLZ_1, \ldots, NLZ_{m-1} \mid \lambda) = \tag{7}$$

$$e^{-count_0 \frac{\lambda}{m}} \left( \prod_{k=1}^{q} \left( e^{-\frac{\lambda}{m2^k}} \left( 1 - e^{-\frac{\lambda}{m2^k}} \right) \right)^{count_k} \right) \left( 1 - e^{-\frac{\lambda}{m2^q}} \right)^{count_{q+1}}$$

The idea is to use a maximum likelihood approach to calculate an estimate for the mean $\lambda$ of the assumed Poisson distribution and use it as estimate for the cardinality. The maximum likelihood method uses a set of observations and an assumed parameterized probability model to find those values for the parameters of the probability model that best match the observations and use those values as estimates for the parameters. In this case, the maximum likelihood approach would use a likelihood function which may be constructed by using the probability mass function as given in equation 7 with a fixed NLZ register set and a variable $\lambda$. Typically, the process to estimate a parameter value for a probability model starts with an initial value for the parameter and then successively adapts the parameter value in order to maximize the likelihood function. The process continues until the difference between two subsequent steps is below a certain threshold. Equation 8 shows a variant of a likelihood function derived from equation 7 that may be used to maximize the mean parameter $\lambda$ for an observed set of register counts. The depicted likelihood function is the log-likelihood function which is a logarithmized version of the original likelihood function. Applying the logarithm does not change the maximum point of the likelihood function (i.e. the parameter value that maximizes the value of the function), but it provides an equation that is easier to process numerically, e.g. because the logarithm translates exponents into multipliers or multiplications into additions. Equation 8 also exploits the fact that likelihood function can be expressed in terms of the compacted histogram data. This dramatically reduces the number of terms that need to be evaluated (e.g. for p=12 and q=20, 22 histogram bins instead of $2^{12}$ NLZ registers). See e.g. the first part of equation 8 where the log likelihood function for $\lambda$ for a given NLZ register set is set equal to the log likelihood function for $\lambda$ for a given set of histogram bins (details can be found in "oertl/hyperloglog-sketch-estimation-paper" and in arXiv preprint:1702.01284 (2017)).

$$\log \mathcal{L}(\lambda \mid NLZ_0, NLZ_1, \ldots, NLZ_{m-1}) = \tag{8}$$

$$\log \mathcal{L}(\lambda \mid count_0, count_1, \ldots, count_{q+1}) =$$

$$-\frac{\lambda}{m} \sum_{k=0}^{q} \frac{count_k}{2^k} + \sum_{k=1}^{q} count_k \log\left(1 - e^{-\frac{\lambda}{m2^k}}\right) + count_{q+1} \log\left(1 - e^{-\frac{\lambda}{m2^q}}\right)$$

Consequently, following step 904 calculates an initial estimate for A as starting point for the maximum likelihood optimization. The determination of the initial estimate may evaluate the number of NLZ m ($=2^p$), a term "A" depending on the number of NLZ registers with a value smaller than q+1 and a term "B" depending on the number of register values greater than 0. Equation 9 may be used to calculate term "A" and equation 10 may be used to calculate term "B".

$$a = \sum_{k=0}^{q} \frac{count_k}{2^k} \tag{9}$$

$$b = \sum_{k=1}^{q} \frac{count_k}{2^k} + \frac{count_{q+1}}{2^q} \tag{10}$$

Further, step 904 may determine if "B" is smaller by a certain factor (e.g. 1.5) than "A", and in this case, use equation 11 to calculate an initial estimate, otherwise it may use equation 12. Alternatively or additionally, step 904 may use 0 as initial estimate.

$$\text{initial estimate} = \frac{m(m - count_0)}{0.5B + A} \tag{11}$$

$$\text{initial estimate} = \frac{m(m - count_0)}{B} \log\left(1 + \frac{B}{A}\right) \tag{12}$$

Following step 905 calculates a termination condition parameter for the maximum likelihood optimization in form of a minimum relative change between two iterations. A value change below this minimum change indicates that no substantial estimation improvement can be expected from further iterations and that the optimization process can be terminated. Step 905 may consider a desired maximum estimation error in form of a factor $\varepsilon$ and a factor describing the quality of the input data, like e.g. the number of NLZ registers to calculate the termination condition. Equation 13 shows an exemplary way to calculate this termination condition parameter.

$$\min_{change} = \varepsilon / \sqrt{\text{number of } NLZ \text{ regisers}} \tag{13}$$

After an initial value and a termination condition for the optimization process have been determined by steps 904 and 905, an iterative optimization method that is applicable for the optimization problem is chosen. Exemplary applicable iterative optimization methods include but are not limited to the secant method and Newton-Raphson method. Afterwards, the process continues with step 906 which executes a step of the chosen iterative optimization method to calculate an updated value for the estimate of λ that is more likely according to the likelihood function given the observations of the HLL Sketch Record. Following step 907 evaluates if the optimization termination condition is met, e.g. by determining if the relative difference of the estimate is smaller than $\min_{change}$ calculated according to equation 13. In case the termination condition is not met, step 912 is executed which makes the new estimate available as initial estimate and starts a new iteration cycle with step 906.

In case the termination condition is met, step 909 is executed which returns the current estimate for λ as cardinality estimate. The process then ends with step 910.

Next to the cardinality estimation of individual sets, the estimation of the cardinality of the result of set operations are important input for various analysis tasks. The common analysis methods for HLL sketch records provide good support for the cardinality estimation for set unions, e.g. by using the per register address maximum NLZ register value of HLL sketch records that represent the input sets for the set union operation, but they do not provide support for other set operations like intersection or relative complement. The current approach to calculate cardinality estimates for such set operations is based on the inclusion-exclusion principle that uses the cardinality estimate of the input sets and the cardinality estimate for the result of the union operation to calculate cardinality estimates for intersections and the like.

FIG. 10 describes the inclusion-exclusion principle in detail. Two sets A 1001 and B 1002 share elements and therefore have an intersection A∩B 1003. Further, the relative complements A\B 1007 and B\A 1008 are defined as the set containing all elements of A that are not contained in B and vice versa. The union of A and B contains the elements of A∩B only once, whereas A and B each contain the elements of a A∩B. Therefore, the sum of the cardinalities of A and B counts the members of A∩B twice and the cardinality of A∪B counts the members of A∩B only once. This may be used to calculate the cardinality of A∩B by adding the cardinality of A and B and subtracting the cardinality of A∪B, as shown in 1004. The cardinality of A\B and B\A may be calculated in a similar way, see 1005 and 1006. Although this method to calculate an estimate for set operation results other than union from cardinality estimations of the input sets and of the union of the input sets is convenient and efficient, this approach introduces a large estimation error, which can in the worst-case lead to impossible estimation results like e.g. a negative cardinality.

One reasons for the large estimation error is that the inclusion-exclusion approach is based on multiple individual cardinality estimations and the estimation error is accumulated. Another reason is that this approach only uses data from incoming HLL sketch relevant to determine the cardinality of an individual set, but the combined observations of two or more HLL sketches may also be interpreted to determine the cardinality of set elements contained by all, multiple or only one of the input sets. As an example, NLZ registers with the same address showing the same value in multiple HLL registers may be interpreted as indicators for elements of an intersection of the sets described by the HLL sketches. Further, a HLL sketch for a set A 1001 may be interpreted as the union-combined HLL sketch (using max value of each input NLZ register pair) of a set containing the elements of A\B and a set containing the elements of A∩B. This and other observations and findings (details can be found in "oertl/hyperloglog-sketch-estimation-paper" and in arXiv preprint:1702.01284 (2017)) may be used to extract histogram data from multiple HLL sketches that contain statistics that provide input data for the estimation of the cardinality for various set operation results.

An exemplary data record that may be used for statistics extracted from two HLL sketch records as basis for the estimation of the intersection and relative complements of the sets described by the HLL sketch records is shown in FIG. 11. It is noteworthy that although following methodology to calculate estimations for set operation results is demonstrated on two HLL sketches, it may be applied on more than two HLL sketches with minimal adaptations and without leaving the spirit and scope of the present invention.

A register delta record 1101 as depicted in FIG. 11 may be used to store data extracted from two HLL sketches that represents statistical input data for the cardinality estimation for the result of set operations like intersection or relative complement as if performed on the sets described by the analyzed HLL sketch records. A register delta record 1101 may contain but is not limited to a delta histogram A=B 1102, containing the histogram of HLL registers of sketch A that have the same value in sketch B, a delta histogram A>B 1103 containing histogram data of HLL registers of sketch A for which the register value is greater than the value of the corresponding register (i.e. register with the same address) from HLL sketch B, a delta histogram A<B 1104 with histogram data from registers of sketch A where register value is smaller than the value of the corresponding register from sketch B, delta histogram B>A 1105 for registers of sketch B with a value greater than the value from the corresponding register of sketch A and a delta histogram B<A 1006 for registers from sketch B with a register value that is smaller than the value of the corresponding register in sketch A. The inner structure of all delta histograms 1102 to 1106 is equal to the structure of a NLZ histogram 220 described in FIG. 2c. Such a histogram contains a bin 221 for each possible register value 222, and each bin contains a count 223 to store the number of occurrences of a specific register value.

Coming now to FIG. 12 which shows a flow chart conceptually describes the creation of a register delta record with data extracted from two HLL sketch records. It is noteworthy that a prerequisite for the now described methodologies are structural equivalent HLL sketch records. Structural equivalence includes in this case, the same number of NLZ registers, the same value range the NLZ registers for both HLL records and that the same hashing method and hash value bit width was used to create both NLZ records.

The process starts with step 1201 when a pair of HLL records containing sketch A and sketch B is available. Subsequent step 1202 creates a new register delta record 1101 and sets all counts 223 of all histograms (1102 to 1106) to 0. Following step 1203 selects the first register address (i.e. address 0) and subsequent step 1204 fetches the NLZ value of the selected register address from HLL sketch A as value X and from HLL sketch B as value Y. Afterwards, decision step 1205 determines if X is greater than Y. If X is greater than Y, step 1209 is executed which increments the count of delta histogram A>B 1103 for the bin representing value X and which further increments the count of delta histogram B<A 1106 for the bin representing value Y. In case decision step 1205 determines that X is not greater than Y, following decision step 1206 determines if Y is greater than X. In case Y is greater than X, step 1207 is executed which increments the count of delta histogram A<B 1104 for the bin representing value X and which further increments the count of delta histogram B>A 1105 for the bin representing value Y. In case Y is not greater than X (and not smaller, which means that X is equal to Y), step 1208 is executed which increments the count of delta histogram A=B 1102 for the bin representing value X.

Decision step 1211 is executed after step 1207, 1208 or 1209 and determines if a next register address is available. If a next register address is available, this address is selected in step 1210 and the processing of the next register pair continues with step 1204. If no more register address is available, the creation of the register delta record 1101 is finished and the process ends with step 1212. A register delta record 1101 generated out of two HLL records represents a sufficient statistic for the analysis task to determine cardinality estimates for the intersection and the relative complements of the sets described by the two HLL records.

Referring now to FIG. 13 which contains a flow chart that conceptually describes the process that evaluates a register delta record 1101 as generated by the process described in FIG. 12 to calculate estimations for the cardinality of the intersection and the relative differences of the two sets described by the evaluated register delta record 1101. The process starts with step 1301 when a register delta record for evaluation is received. Following step 1302 performs an initial analysis of the register delta record to determine extreme and report extreme conditions, like observation data that indicate disjoint sets. The case of disjoint sets may be e.g. identified by determining if for all NLZ register pairs at least one value is 0. This indicates that the selected NLZ registers during the creation of both HLL records are distinct, which further indicates distinct sets. In case step 1302 identifies such extreme observation conditions, the result is reported in step 1312 (i.e. for distinct sets |A∩B|=0, depending on the set operation for which a cardinality estimate was requested.) and the process ends with step 1311.

Afterwards, the process continues with step 1303 which interprets the received observation data as result obtained from a process that follows a model where the cardinalities for |A∩B|, |A\B| and |B\A| are not fixed but distributed according to a Poisson distribution. As described earlier, this is a tolerable approximation. The assumption of a Poisson process further provides a more relaxed probability model (independent probability functions for individual NLZ registers) that provides a mathematically simple way (multiplication of individual probability functions) to generate an overall probability function for all NLZ registers. The generated overall probability function interprets the observation data of the received register delta record as generated by a Poisson process, where the Poisson process is parameterized by three parameters $\lambda_a$, $\lambda_b$ and $\lambda_x$. Those parameters also describe the cardinality of the intersection of both input sets and the cardinalities of their relative complements.

Following step 1304 uses the above explained inclusion-exclusion principle as described above to create initial cardinality values for the following optimization set, and subsequent step 1305 determines a value for a termination condition of the optimization process. Similar to the maximum likelihood-based evaluation for one HLL sketch, the value termination condition may be calculated using equation 13. However, as there are now three parameters that are optimized, the evaluation of the termination condition also must consider all three parameter changes.

Following step 1306 executes one step of an appropriate optimization methodology (e.g. the Broyden-Fletcher-Goldfarb-Shanno algorithm for solving nonlinear optimization problems) that evaluates the overall probability function under the observations received with the register delta and with the initial approximation of the current three parameter values to calculate three updated parameter values that are more likely explain the received observation data under the assumed overall probability function. The optimization methodology may operate on a log-likelihood function derived from the overall probability function. Equation 14 shows the log-likelihood function that may be used. In equation 14, "$\text{hist}_{A=B}$" represents counts from the delta histogram A=B 1102, "A>B" the counts from delta histogram A>B 1102 etc. and "count(A>B)$_k$" denotes the count of the bin for register value k of delta histogram A>B 1102. Equation 14 also expresses the fact that the original observation data provided by the two analyzed HLL records A and B in form of NLZ register sets $NLZ_A$ and $NLZ_B$ is equivalent to the data of a corresponding register delta record 1101 for the task to calculate cardinality estimates for |A∩B|, |A\B| and |B\A|.

$$\log\mathcal{L}(\lambda_a, \lambda_b, \lambda_x \mid NLZ_A, NLZ_B) = \tag{14}$$

$$\log\mathcal{L}(\lambda_a, \lambda_b, \lambda_x \mid \text{hist}_{A=B}, \text{hist}_{A<B}, \text{hist}_{A>B}, \text{hist}_{B<A}, \text{hist}_{B>A}) =$$

$$\sum_{k=1}^{q}\left[\log\left(1 - e^{-\frac{\lambda_a+\lambda_x}{m2^k}}\right)\text{count}(A<K)_k + \log\left(1 - e^{-\frac{\lambda_a+\lambda_x}{m2^k}}\right)\text{count}(B<A)_k\right] +$$

$$\sum_{k=1}^{q+1}\left[\log\left(1 - e^{-\frac{\lambda_a}{m2^{\min(k,q)}}}\right)\text{count}(A>B)_k + \log\left(1 - e^{-\frac{\lambda_b}{m2^{\min(k,q)}}}\right)\text{count}(B>A)_k + \right.$$

$$\left.\log\left(1 - e^{-\frac{\lambda_a+\lambda_x}{m2^{\min(k,q)}}} - e^{-\frac{\lambda_b+\lambda_x}{m2^{\min(k,q)}}} + e^{-\frac{\lambda_a+\lambda_b+\lambda_x}{m2^{\min(k,q)}}}\right)\text{count}(A=B)_k\right] -$$

$$\frac{\lambda_a}{m}\sum_{k=0}^{q}\frac{\text{count}(A<B)_k + \text{count}(A=B)_k + \text{count}(A>B)_k}{2^k} -$$

$$\frac{\lambda_b}{m}\sum_{k=0}^{q}\frac{\text{count}(B<A)_k + \text{count}(A=B)_k + \text{count}(B>A)_k}{2^k} -$$

$$\frac{\lambda_x}{m}\sum_{k=0}^{q}\frac{\text{count}(A<B)_k + \text{count}(A=B)_k + \text{count}(B<A)_k}{2^k}$$

Subsequent step 1307 determines if the optimization termination condition is met, e.g. by determining if the relative change of all three parameter values is below the optimization termination value calculated in step 1305. If the termination condition is not met, following decision step 1308 continues the process with step 1309 which uses the new parameter values as initial parameter values and afterwards starts a new optimization iteration with step 1306.

If otherwise the optimization termination condition is met, the process continues with step 1310 which uses the optimized estimate for parameter $\lambda_x$ as estimate for $|A \cap B|$, the estimate for parameter $\lambda_a$ as estimate for $|A \backslash B|$ and the estimate for $\lambda_b$ as estimate for $|B \backslash A|$. The estimates for the cardinalities $|A \cap B|$, $|A \backslash B|$ and $|B \backslash A|$ are returned and the process ends with step 1311.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of estimating cardinality of data sets, comprising:
   receiving a first data set recorded in a first sketching data structure in accordance with a HyperLogLog method where the first sketching data structure represents set A;
   receiving a second data set recorded in a second sketching data structure in accordance with a HyperLogLog method, where the second sketching data structure represents set B;
   defining a statistical model with model parameters $\lambda_a$, $\lambda_b$, and $\lambda_x$, where $\lambda_a$ indicates the cardinality of elements in set A that are not in set B, $\lambda_b$ indicates the cardinality of elements in set B that are not in set A, and $\lambda_x$ indicates the cardinality of elements that are both in set A and set B; and the statistical models describes probability distributions of values stored in the first sketching data structure and the second sketching data structure;
   determining an initial value for the model parameters using an inclusion-exclusion principle; and
   starting with the initial value for the model parameters, determining optimized values for the model parameters that maximize a likelihood function using data in the first sketching data structure and the second sketching data structure as fixed input of the likelihood function, where the likelihood function determines an estimate probability value for a given set of model parameters; and
   iteratively determining the optimized values for the model parameters by changing the values of the model parameters to find optimized values of the model parameters until an optimization condition is satisfied, where the optimized values for the model parameters occur when output of the likelihood function has highest value.

2. The method of claim 1 wherein the likelihood function is further defined as a log likelihood function.

3. The method of claim 1 further comprises iteratively determining the optimized values for the model parameters using Broyden-Fletcher-Goldfarb-Shanno method.

4. The method of claim 1 further comprises
creating a delta record with data extracted from the first data set and the second data set, where the delta record includes a first histogram, a second histogram, a third histogram, a fourth histogram and a fifth histogram, each histogram has a bin for each possible value recorded in the first and second sketching data structures,
wherein the bins in the first histogram contain a count of occurrences that a register value in the first sketching data structure equals corresponding register value in the second sketching data structure,
wherein the bins in the second histogram contain a count of occurrences that a register value in the first sketching data structure is greater than corresponding register value in the second sketching data structure,
wherein the bins in the third histogram contain a count of occurrences that a register value in the first sketching data structure is less than corresponding register value in the second sketching data structure,
wherein the bins in the fourth histogram contain a count of occurrences that a register value in the second sketching data structure is greater than corresponding register value in the first sketching data structure,
wherein the bins in the fifth histogram contain a count of occurrences that a register value in the second sketching data structure is less than corresponding register value in the first sketching data structure; and
iteratively determining the optimized values for the model parameters using values of the delta record.

5. The method of claim 1 wherein the first data set and the second data set represent users of a computer application in a distributed computing environment.

6. The method of claim 1 wherein the first data set and the second data set are derived from a plurality of transactions executed in a distributed computing environment.

7. A computer-implemented method for estimating the cardinality of set operations on data sets, comprising:
receiving a first data set recorded in a first sketching data structure in accordance with a HyperLogLog method, where the first sketching data structure represents set A;
receiving a second data set recorded in a second sketching data structure in accordance with a HyperLogLog method, where the second sketching data structure represents set B;
calculating a delta record that describes differences between the first sketching data structure and the second sketching data structure by comparing a value for a register at a specific register address from the first sketching data structure with a value of a register at the same specific register address from the second data structure and recording results of this comparison in the delta record;
defining a statistical model with model parameters, where the model parameters indicate cardinality of values which result from set operations performed on set A and set B; and
determining values for the model parameters by maximizing a likelihood function for the statistical model in relation to the delta record, where the likelihood function determines an estimate probability value for a given set of model parameters.

8. The method of claim 7 wherein the set operations for which the result cardinality is estimated is one of the intersection of set A and set B, the relative complement of set A with respect to set B, and the relative complement of set B with respect to set A.

9. The method of claim 7 further comprises defining the statistical model with model parameters $\lambda_a$, $\lambda_b$, and $\lambda_x$, where $\lambda_a$ indicates the cardinality of elements in set A that are not in set B, $\lambda_b$ indicates the cardinality of elements in set B that are not in set A, and $\lambda_x$ indicates the cardinality of elements that are both in set A and set B.

10. The method of claim 7 wherein determining values for the model parameters further comprises
determining an initial value for the model parameters;
starting with the initial value for the model parameters, determining an optimized value for the model parameter that maximizes the likelihood function; and
iteratively determining the optimized value for the model parameter by changing the value of the model parameters to find an optimized value of the model parameter until an optimization condition is satisfied, where the optimized value of the model parameter occur when the likelihood function has highest value.

11. The method of claim 10 further comprises determining an initial value for the model parameters using an inclusion-exclusion principle.

12. The method of claim 7 wherein the likelihood function is further defined as a log likelihood function.

13. The method of claim 12 further comprises iteratively determining the optimized values for the model parameters using Broyden-Fletcher-Goldfarb-Shanno method.

14. The method of claim 7 further comprises storing differences between the first and the second sketching data structure in form of histograms, where each possible register value is represented by a bin of one of the histograms, and the value of the bin is based on the result of the comparison of the values of two registers from first and second sketching data structure having the same register address.

15. The method of claim 7 further comprises
creating in the delta record a first histogram, a second histogram, a third histogram, a fourth histogram and a fifth histogram, each histogram has a bin for each possible value recorded in the first and second sketching data structures,
wherein the bins in the first histogram contain a count of occurrences that a register value in the first sketching data structure equals corresponding register value in the second sketching data structure,
wherein the bins in the second histogram contain a count of occurrences that a register value in the first sketching data structure is greater than corresponding register value in the second sketching data structure
wherein the bins in the third histogram contain a count of occurrences that a register value in the first sketching data structure is less than corresponding register value in the second sketching data structure,
wherein the bins in the fourth histogram contain a count of occurrences that a register value in the second sketching data structure is greater than corresponding register value in the first sketching data structure,
wherein the bins in the fifth histogram contain a count of occurrences that a register value in the second sketching data structure is less than corresponding register value in the first sketching data structure; and
iteratively determining the optimized values for the model parameters using values of the delta record.

16. The method of claim 7 further comprises iteratively determining the optimized value for the model parameter by
determining current values for the model parameters that maximizes the likelihood function using data in the sketching data structure;

computing differences between current values of the model parameters with corresponding most recent estimate of the model parameters; and continuing iterating until the largest computed difference is less than a minimum change threshold, where the minimum change threshold is set as $$\min_{change} = \varepsilon/\sqrt{\text{number of } NLZ \text{ regisers}}$$

where $\varepsilon$ is a desired maximum estimation error.

17. The method of claim 7 wherein the first data set and the second data set represent users of a computer application in a distributed computing environment.

18. The method of claim 7 wherein the first data set and the second data set are derived from a plurality of transactions executed in a distributed computing environment.

* * * * *